United States Patent [19]

Blomberg

[11] 4,256,929
[45] Mar. 17, 1981

[54] TELEPHONE SET WITH STORING BOX

[76] Inventor: Knut H. Blomberg, Lokattsvägen 39, S-161 37 Bromma, Sweden

[21] Appl. No.: 40,707

[22] Filed: May 21, 1979

[30] Foreign Application Priority Data

Jun. 9, 1978 [SE] Sweden .............................. 7806703

[51] Int. Cl.³ ........................ H04M 1/02; H04M 1/21
[52] U.S. Cl. ........................... 179/100 D; 179/100 L; 179/179
[58] Field of Search ........... 179/100 R, 100 D, 100 L, 179/103, 178, 179, 90 K, 1 PC; 40/336, 337

[56] References Cited

U.S. PATENT DOCUMENTS

| | | | |
|---|---|---|---|
| 2,620,407 | 12/1952 | Nagy | 179/178 |
| 3,345,769 | 10/1967 | Nathan | 179/178 |
| 3,838,229 | 9/1974 | Morrell et al. | 179/179 |
| 4,008,379 | 2/1977 | Watkins | 179/16 EC |
| 4,032,727 | 6/1977 | Burns, Jr. | 179/100 R |
| 4,153,822 | 5/1979 | Ueda et al. | 179/103 |

FOREIGN PATENT DOCUMENTS 1223889 9/1966 Fed. Rep. of Germany ...... 179/100 D
1487428 12/1973 Fed. Rep. of Germany ........... 179/179

OTHER PUBLICATIONS

H. Hansbauer, S. Schon, "Modular Telephone User Equipment Line"; Siemens Telefon Report 9; Mar. 1973; Nos. 2-3; pp. 73-83.

*Primary Examiner*—James W. Moffitt
*Assistant Examiner*—Randall P. Myers
*Attorney, Agent, or Firm*—Hane, Roberts, Spiecens & Cohen

[57] ABSTRACT

A telephone set which is provided with extra space normally intended to accommodate additional communication equipment such as, for example, loud-speaking equipment. A storage box, preferably rectangular and made of plastic, is inserted into said extra space, the components, circuit cards, etc. then being sealed off from the telephone user. The box can, for example, accommodate a roll of paper and is provided with a cover and longitudinal grooves, the paper running in the grooves and forming a writing surface for the user.

10 Claims, 7 Drawing Figures

TELEPHONE SET WITH STORING BOX

FIELD OF THE INVENTION

The invention relates to a telephone set with a storage compartment.

BACKGROUND

Telephone sets are often, except for the common elements such as the handset, a signalling device and a dial or set of push-button necessary for the ordinary telephoning function, provided with additional arrangements, for example, for internal communication and signalling needs, loudspeaking function etc. These arrangements are located in the fixed part of the set which must be dimensioned with sufficient space for them. It is, however, desirable both by the telephone industry and the telephone administrations to keep the number of telephone set models as low as possible. Therefore efforts have been made to construct sets provided for various types of telephone versions within the same cover configuration. Most telephone sets in the telephone networks are, however, the common telephone sets without auxiliary equipment. These sets will then contain a space which is not used for the telephone technical components included.

SUMMARY OF THE INVENTION

The object of the present invention is to use this space for other means which are not connected with the telephone technical equipment but which can provide further convenience for the subscriber when using the telephone. Such means are, for example, a note pad or the like, a table of subscriber's numbers etc. According to the invention, a storage compartment is arranged in the fixed part of the telephone set, in which the subscriber can put interchangeable units containing the different means.

It is previously known to incorporate a number register or the like in a telephone set cover instead of forming it as a separate supplement to the set. It is also known to provide a box containing a removable register of numbers noted on a paper roll in a telephone set of the common type having a plastic cover which forms a rigid seat for the microphone and with a push button set or dial in its inclined front surface.

According to the invention, and in contrast to these proposals, a storage compartment is provided in the space intended for the telecommunication equipment, in such a way that the compartment is free from the telephone technical components and the connections of the telephone set. Simultaneously, the compartments is totally or partly detachable to create a space for said equipment and to enable the connection of the equipment to the circuits of the set. Such equipment is now often constructed in the form of modules and the circuits in the form of printed cards to which the modules are connected with plugs and jacks. It is then important that in a set which instead has a compartment used by a layman (the telephone user), this cannot reach the vital parts of the set which, on the contrary, should be easily available for the skilled worker.

BRIEF DESCRIPTION OF THE DRAWING

The invention will be more fully described in connection with the accompanying drawing showing one embodiment thereof.

DETAILED DESCRIPTION

Figure 1:
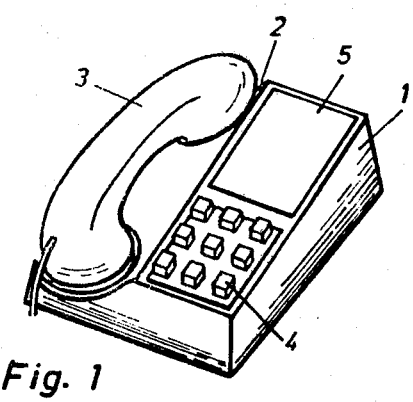
FIG. 1 shows a telephone set with a push-button set.

In FIG. 1, 1 designates the plastic cover of the telephone set, whose cover in its left part is formed as a holder 2 for the handset 3. This part includes, among other things, cradle switches, signal devices and the fixed components of the transmission circuit.

Figure 2:
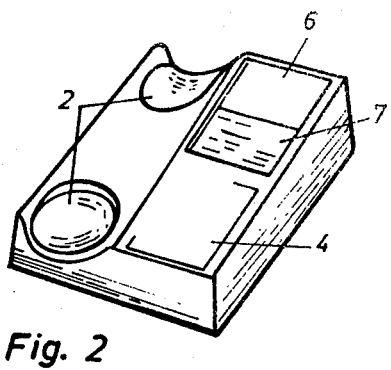
FIG. 2 shows a telephone set according to FIG. 1, where the instrument cover is opened at a space, intended for supplemental equipment.

On the right side, a push-button set 4 is situated and above the set 4 is a space for supplemental equipment. This space is, in the simple telephone variant, covered by the instrument cover, preferably in the form of a removable sheet 5. In FIG. 2, this sheet is removed and the empty space exposed. Through the opening 6 a printed card 7, mounted at the bottom of the set, can be seen on which the circuit system of the set is printed and which carries the different components of the telephone set.

Figure 3:
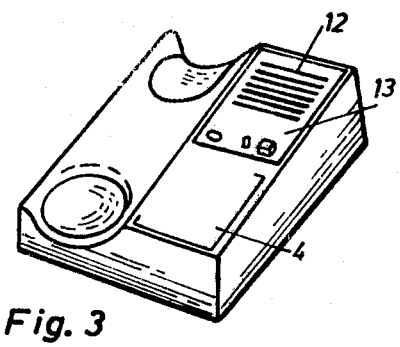
FIG. 3 shows the telephone set, according to FIG. 1 both for lowspeaking and loudspeaking
Figure 4:
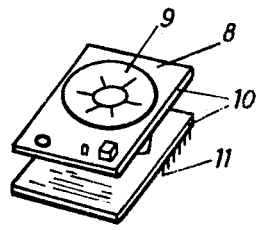
FIG. 4 shows the loudspeaker equipment.

In a loudspeaking telephone variant, shown in FIG. 3, a loudspeaking supplement 8, shown in FIG. 4, is inserted into the space. In addition to the loudspeaker 9, the module contains printed cards 10 with the components and the circuits necessary for the loudspeaking function. The lower card is provided with connecting devices for connection to the printed card 7 of the set, in the form of connection pins 11 which engage in corresponding jacks in the card 7 when the module is inserted into the set. The module is covered by a plate 13, supplied with appropriate sound apertures 12, the plate fitting into the opening of the instrument cover.

Another variant with supplementary telephone technical equipment comprise a telephone set arranged for communication with a number of internal lines. The supplementary module then contains the necessary connecting devices consisting of control buttons with associated signalling lamps etc. arranged in the cover plate and in the bottom by means of connecting pins to the circuit cards of the set.

Figure 5:
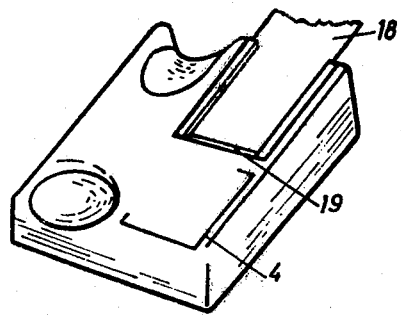
FIG. 5 shows the telephone set according to FIG. 1, equipped with an arrangement for taking notes.

FIG. 5 shows a telephone set with additional equipment which has no connection to the technical part of the set. It consists of a device for notation by the telephone user when calling. It is well known that such a configuration in the form of a note pad or similar article often is missing in a common telephone set, when most needed. Such an arrangement, however, will always be conveniently available in this telephone set.

The modules, previously described, for loudspeaking and internal communication, respectively are permanently connected to the telephone set by a skilled worker. On the contrary, an article for notes or the like. is optionally installed by the telephone user without reaching the technical part of the set, which is only to be used by the professional. For this purpose the telephone set has, according to the invention, a totally or partly removable compartment or box which covers the internal telephone equipment. In the box the various articles can be inserted.

Figure 6:
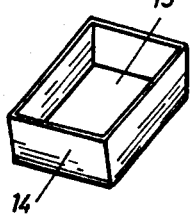
FIG. 6 shows the a box.

The box, shown in FIG. 6, consists of a rectangular box 14, preferably made of plastic. When the box is placed in the opening 6 of the cover, the edges extend to the edges of the opening and the base 15 is above the printed card 7, covering this. Instead of such a box with four walls, the box can consist of one or more of the walls of the cover. The removable part then consists of a covering base plate, optionally with associated wall section.

Figure 7:
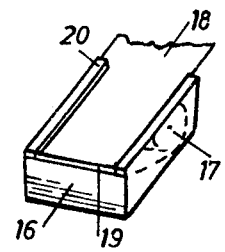
FIG. 7 a box for use in the arrangement according to FIG. 5.

FIG. 7 shows a note unit 16, preferably made of plastic. This unit contains a paper roll 17, whose spindle is stored in the sides of the box. The paper strip 18 can be pulled through a slit 19 at the front end. The strip then slides above the upper side of the cover between two grooves 20 along the longitudinal sides. The upper surface forms a rigid support for the writing surface. When inserted into the instrument, the box will be situated at the level of the upper surface of the instrument cover and a convenient writing position is obtained. The used paper will be torn along a toothed edge at the rear edge of the box.

The described note unit is only one example of arrangements for use by the subscriber which can be used in the telephone set. In another unit writing can be made on a so called permanent sheet with removable writing. Another example is a box with a telephone number registry. The registry can be made in different ways, for example, as a card index under a cover or a pad with sheets of which the desired letter sheet can be chosen in advance and opened when the cover is opened. Another casette can contain a calender and so on.

The telephone set can, in itself, be of a configuration differing from that shown without deviating from the principle of the invention. It can, for example, be of the traditional type with a handset transversely on the instrument cover instead of in the axial direction of the set.

What we claim is:

1. A telephone set comprising a hollow housing containing telephone communication equipment including circuit board means, said housing including a cover, said circuit board means having a connector portion adapted for insertion of supplementary telephone circuit modules connectable with said telephone communication equipment, said cover having an opening through which said modules can be inserted for operative connection with said connector portion, and a box adapted to fit in said opening when the latter is unoccupied by one of said supplementary modules, said box being supported by said housing to separate a user of the telephone set from said connector portion when fitted into said opening, and means in said box for providing informational aid to said user separate and apart from the functional operation of the telephone set but adapted to assist said user in a supplementary fashion, said informational aid means being acessible through said opening in said cover.

2. A telephone set as claimed in claim 1 wherein said box is removably fitted in said housing.

3. A telephone set as claimed in claim 1 wherein said box is recessed within said housing and is bounded in entirety by smooth walls to provide an enclosed compartment.

4. A telephone set as claimed in claim 1 wherein said informational aid means surface means.

5. A telephone set as claimed in claim 4 wherein said writing surface includes paper.

6. A telephone set as claimed in claim 5 wherein said paper is in the form of a roll which is unwound from said box.

7. A telephone set as claimed in claim 1 wherein said informational aid means comprises an index for telephone numbers.

8. A telephone set as claimed in claim 1 wherein said box is rectangular.

9. A telephone set as claimed in claim 1 wherein said box is plastic.

10. A telephone set as claimed in claim 1 wherein said informational aid means is replaceable in said box.

* * * * *